3,018,236
RADIATION INDUCED ETHYLENE
POLYMERIZATION
James E. Shewmaker, Fanwood, and Joseph F. Nelson, Westfield, N.J., assignors to Esso Research and Engineering Company, a corporation of Delaware
No Drawing. Filed Dec. 18, 1956, Ser. No. 628,969
5 Claims. (Cl. 204—154)

This invention relates to hydrocarbon radiation chemistry. It is particularly concerned with the conversion of ethylene by high energy ionizing radiation. According to this invention, ethylene is readily and effectively polymerized to high molecular weights under the influence of a promoting amount of water and radiation, such as beta rays, neutrons and particularly gamma rays.

In brief compass, this invention proposes a process which comprises polymerizing ethylene by exposure to high energy ionizing radiation, preferably gamma rays, in the presence of at least 0.01 wt. percent water, and at a temperature above 0° C.

In this manner polyethylene is prepared. This product is a useful plastic used as an electrical insulator, packaging material and in the fabrication of pipe, washers, nuts, kitchen utensils and many other structural materials. This product is especially valuable as an insulator, since it contains no catalyst residues or other impurities which would lower its electrical resistance. At the higher polymerization temperatures disclosed below, oily products are obtained which are suitable for use as lubricants or as olefins for use in chemical syntheses. Under intermediate conditions, waxes are obtained.

It has now been found that when ethylene is polymerized by ionizing radiation in the absence of conventional polymerization catalysts, the presence of water greatly accelerates the polymerization and influences the character of the product. The yield of polymer is greater and the molecular weight of the product is substantially higher than the product obtained by polymerization in the absence of water.

Of the olefins so far investigated, ethylene appears to be the only one that responds to promotion by water during radiation induced polymerization. For example, experiments so far have shown that propylene polymerizations do not respond to promotion by water. This unique effect is surprising and unexpected, and at present is unexplainable.

Ethylene can be obtained in any convenient manner known to the art, such as high temperature cracking of hydrocarbons. For example, paraffin waxes or petroleum fractions such as heavy residua, naphthas or gas oils can be cracked at temperatures above 850° F. to obtain this raw material in commercial yields.

While mixtures of ethylene with other olefins can be converted, it is preferred to convert substantially pure ethylene. The concentration of the olefin excluding the water in the reactants, is preferably at least 5 wt. percent.

The water is used in an amount of at least 0.01 wt. percent, based on ethylene feed, such that it has an appreciable vapor pressure in the reaction zone. Up to 15 wt. percent can be used. The preferred concentration of water is that sufficient to saturate the vapor at whatever temperature is used.

The conditions may be adjusted to carry out the polymerization in either the liquid or vapor phase. One feature of this invention is that the polymerization of ethylene or its admixture with other olefins can be carried out at pressures substantially lower than those used by the prior art in the absence of radiation. The pressure can range from 50 to 10,000 p.s.i.g., or higher with 1,000 to 6,000 p.s.i.g. being preferred. The temperature of the reaction is adjusted to correspond with the pressure, and can range from 0° to 350° C. As temperature increases, the molecular weight of the product tends to decrease. For this reason, the temperature can be varied over a wide range to produce either solids or liquid polymers.

By high energy ionizing radiation is meant radiation from terrestrial sources consisting of photons having a wave length less than 50 A., such as gamma and X-rays, rapidly moving charged or uncharged particles of an atomic or subatomic nature having an energy above 30 ev. such as beta rays, and neutrons, of sufficient intensity such that the dose rate is at least 100 equivalent roentgens per hour. This excludes radiations such as cosmic and ultraviolet which are ineffectual for the purposes of this invention.

When the dose rate is below about 25 equivalent roentgens per hour, the polymerization rate is so low or negligible that no promoting effect by the water is obtainable or not noticeable.

The dose received by the product is in the range of 0.001 to 10 kwh./lb., preferably 0.01 to 1. The amount of radiation absorbed is sufficient to yield a product having a molecular weight in the range of $10^2$ to $10^6$ (Staudinger).

High energy ionizing radiation can be obtained from nuclear reactors, artificial accelerators, such as Van de Graaff generators, from X-ray machines, from waste materials from nuclear reactors, such as spent fuel elements or portions thereof, or from artificially produced isotopes, such as cobalt 60. When essentially gamma rays are used, it is preferred that the gamma ray flux in the reaction zone be above 100,000 roentgens per hour (r./hr.) to achieve a favorable rate of polymerization and to reduce contact times. The reactants can be exposed to irradiation either batchwise or continuously. When using a radioisotope, the reactant stream can be flowed in or around the radioisotope in suitable conduits or containers. Conventional irradiation apparatus can be utilized. For example, a suitable cobalt-60 irradiation source is described by Ghormley et al., Rev. Sci. Instr., 22, 473 (1951).

The reaction can also be made to proceed by exposure to neutrons, with or without gamma rays, obtained from nuclear reactor such as an atomic pile. The reactant stream can be flowed in pipes through, around, or near the fissionable material. Moderators for the nuclear reactor such as carbon, water or hydrocarbons can be employed. In some cases, the feed stream itself can serve as a moderator. With a nuclear reactor, it is preferred to have a neutron flux in the reaction zone of at least $10^{10}$ neutrons/cm.$^2$/sec. to secure a rapid reaction.

Under these conditions an improved yield of polymer is obtained, which is greater than that obtained in the absence of water or by the prior art's teachings. The product is a solid when lower temperatures (below 100° C.) and/or higher pressures (above 500 p.s.i.g.) are used, and it has a molecular weight in the range of 2,000 to 100,000. At low pressures and especially at high temperatures or a combination of the two, liquid polymers can be obtained, the yields being improved by the presence of water.

After the irradiation process, the polymeric product can be treated as desired. It can be molded into many useful articles, because the polymer is thermoplastic. Films can be formed by a calendaring operation, which are useful in packaging, greenhouse windows, etc. The polymer can be compounded with carbon black or other fillers on a mill or it may be admixed with other polymers.

Unreacted olefin, if any, can be recovered and recycled. Residual radioactivity in the product when using neutron irradiation is rarely encountered, and results only when impurities such as sulfur compounds are present in the olefin feed. Sulfur need not be a problem, because modern methods of refining produce olefins containing less than objectionable amounts of sulfur compounds.

This invention is applicable to the radiation induced copolymerization of ethylene with other polymerizable unsaturated monomers, e.g. vinyl aromatics, such as styrene and the methyl styrenes, and olefins such as propylene and the butylenes.

EXAMPLE

In this example, ethylene is polymerized in the presence of water under the influence of radiation obtained from an artificially produced cobalt 60 source in the form of a hollow 2-inch pipe having a rating of about 3100 curies. The particular laboratory irradiation facility of conventional design has been described by J. F. Black et al. in an article received May 24, 1956 by the International Journal of Applied Radiation and Isotopes, vol. 1, No. 4, page 256, published January 1957. About 30 grams of a sample were pressurized into a stainless steel bomb. This was placed near the radiation source such that the gamma ray intensity in the reaction zone was 320,000 r./hr. The initial pressure of the reactants was 1,000 p.s.i.g., and the temperature was room temperature, 25° C. Irradiation was continued until a dosage of 30 megaroentgens was received. The experiments were carried out in the presence and absence of water, and one was carried out in the presence of water but in the absence of irradiation.

Two grades of ethylene were used. One was a chemically pure ethylene (Mathieson C.P. grade). Another series of tests was carried out with 95% pure ethylene, which contained a small amount of paraffins, but less $O_2$ than the C.P. ethylene.

The Table I presents the results of these tests.

Table I

| Feed | Water, Wt. percent on $C_2H_4$ | Yield, Wt. percent on $C_2H_4$ | Melting Point °C. | Mol. Wt. | Appearance |
|---|---|---|---|---|---|
| C.P. $C_2H_4$ | | 31 | 113 | 4,500 | Snow-like white powder. |
| C.P. $C_2H_4$ | 10 | 45 | 114 | 8,200 | Do. |
| 95% $C_2H_4$ [1] | | 46 | 115 | 16,000 | Do. |
| 95% $C_2H_4$ | 10 | 55 | 112 | 22,500 | Do. |
| 95% $C_2H_4$ [2] | 10 | none | | | |

[1] Average of two runs.
[2] A control that was not irradiated.

This table shows that the presence of water increased both the yield and molecular weight of the product.

It is believed that the ability of the gamma ray radiation to polymerize the 95% ethylene to higher yield than when the C.P. grade was used, was caused by the higher oxygen content of the C.P. grade. The C.P. ethylene contained 320 parts per million of oxygen while the 95% ethylene contained 15 p.p.m. of oxygen. Oxygen has an inhibiting effect on the polymerization brought about by irradiation. For this reason, it is preferred that the olefin feed be substantially free of oxygen, i.e., contain less than 100 parts per million of free oxygen.

Other tests have shown that the promotional effect of water is realized only at temperatures above 0° C.

Having described this invention, what is sought to be protected by Letters Patent is succinctly set forth in the following claims.

What is claimed is:

1. A process which comprises polymerizing ethylene in the presence of less than 100 p.p.m. of free oxygen by exposure to high energy ionizing radiation at a dose rate above 100 equivalent roentgens per hour at a temperature above 0° C. and in the presence of a promoting amount of water sufficient to saturate the ethylene vapor at the temperature used up to a maximum of 15 wt. percent.

2. A process which comprises polymerizing ethylene containing less than 100 p.p.m. of free oxygen by exposure to high energy ionizing radiation at a dose rate above 100 equivalent roentgens per hour, at a temperature in the range of 0° C. to 350° C., in the presence of an amount of water sufficient to saturate the ethylene vapor at the temperature used up to a maximum of 15 wt. percent and at a pressure in the range of 50 to 10,000 p.s.i., until 0.001 to 10 kwh. of energy per pound of product has been absorbed.

3. The process of claim 2 wherein said high energy ionizing radiation consists essentially of gamma rays from a radioisotope and the radiation intensity is above 100,000 roentgens per hour.

4. In a process of polymerizing ethylene by high energy ionizing radiation at a temperature above 0° C., the improvement which comprises maintaining a maximum of $O_2$ substantially below about 320 p.p.m. $O_2$ in the ethylene while maintaining a small promoting amount of water sufficient to saturate the ethylene vapor at the temperature used up to a maximum of 15 wt. percent present with the ethylene undergoing polymerization by irradiation to obtain ethylene polymer in increased yield and increased molecular weight.

5. A process for preparing polyethylene which comprises irradiating ethylene containing less than 100 parts per million of free oxygen in admixture with about 10 wt. percent water with gamma rays from cobalt 60 at an intensity of about 320,000 r./hr., a temperature of about 25° C., and an initial pressure of about 1000 p.s.i.g. until a dosage of about 30 megaroentgens has been absorbed, and recovering a solid product.

References Cited in the file of this patent

UNITED STATES PATENTS

| 2,396,677 | Brubaker | Mar. 19, 1946 |
| 2,396,920 | Larson | Mar. 19, 1946 |
| 2,887,445 | Calfee et al. | May 19, 1959 |

FOREIGN PATENTS

| 714,843 | Great Britain | Sept. 1, 1954 |
| 212,374 | Australia | Dec. 6, 1956 |

OTHER REFERENCES

"Utilization of the Gross Fission Products," COO-196, Univ. of Michigan Engineering Research Institute Progress Report 5, pp. 21–26, Sept. 1953.

Abstract of Australian patent application 6253/55, pub. on Oct. 17, 1955.

Collinson et al., "Chemical Reviews," vol. 56 No. 3, pp. 473, 486, June 1956.

Manowitz: "Nucleonics," vol. 10, pp. 18–20, Oct. 1953.

Nature, vol. 160, Aug. 23, 1947, pp. 268–9.

Lewis et al.: "Chem. Eng. Progress," vol. 50, pp. 249–255 (1954).

Ballantine: "Modern Plastics," pp. 131, 132, 134, 136, 142, 228–230 and 232, Nov. 1954.